United States Patent
Fuwausa

[19]

[11] Patent Number: 6,106,127
[45] Date of Patent: Aug. 22, 2000

[54] ILLUMINATING DEVICE FOR WATCHES, GAUGES AND SIMILAR DEVICES

[75] Inventor: Michelle Jillian Fuwausa, Columbia, Md.

[73] Assignee: Luminary Logic Ltd., Columbia, Md.

[21] Appl. No.: 09/272,913

[22] Filed: Mar. 19, 1999

[51] Int. Cl.[7] .................................................. G01D 11/28
[52] U.S. Cl. .............................. 362/29; 362/23; 368/67; 368/227; 116/280; 116/310
[58] Field of Search .................................. 362/23, 26–29, 362/551, 559; 368/67, 226, 227; 116/286, 310

[56] References Cited

U.S. PATENT DOCUMENTS

| | | | |
|---|---|---|---|
| 3,754,130 | 8/1973 | Stone et al. ................................. | 362/29 |
| 4,115,994 | 9/1978 | Tomlinson ................................ | 368/241 |
| 4,328,532 | 5/1982 | Smith ........................................ | 362/19 |
| 4,330,877 | 5/1982 | Barnes ...................................... | 368/67 |
| 5,295,049 | 3/1994 | Terada ...................................... | 362/27 |
| 5,984,485 | 11/1999 | Poli et al. .................................. | 362/26 |

*Primary Examiner*—Sandra O'Shea
*Assistant Examiner*—Ismael Negron
*Attorney, Agent, or Firm*—Gottlieb Rackman & Reisman PC

[57] ABSTRACT

A light source is positioned to direct light downward from the cover of a conventional analog or electro-optical watch, indicator gauge, a meter panel directional gauge or ornamentation display of an image, logo or design or other similar articles. These articles are illuminated by the source for viewing in low light or in the dark by an illumination switch to activate said element. The light source is preferably an LED and it is small enough so that when it is off, it is virtually invisible.

24 Claims, 11 Drawing Sheets

ILLUMINATING DEVICE FOR WATCHES, GAUGES AND SIMILAR DEVICES

BACKGROUND OF THE INVENTION

A. Field of the Invention

This invention relates generally to an improvement in illuminated devices such as electronic timepieces equipped for a conventional analog or digital display, indicator gauges, which may comprises a meter panel, directional gauges, ornamentation displays of an image, logo or design, and other similar articles which are illuminated for viewing under poor lighting conditions.

B. Description of the Prior Art

Historically, watches, gauges and other similar articles were first illuminated by using phosphorescent markings. However, when both the manufacturing methods of phosphorescent materials and the materials themselves proved to be medically and environmentally unacceptable, other illuminating means were developed. Some of these other means include the use of LED, LCD, and fluorescent devices, as well as incandescent bulbs. All of these proved to be unsatisfactory, especially for small devices such as wrist watches.

Additionally, these devices could not provide sufficient illumination due to a non-uniformity in brightness across the illuminated display surface. The insufficient illumination was the result of the positioning or shape of the light source itself which was either a point or linear source thereby making these illumination devices limited and unacceptable.

Recently, electroluminescent lighting, hereinafter referred to as EL, was introduced, for an analog or digital watches as another known alternative. An EL element is positioned underneath the watch dials, or other surfaces, or alternatively the dials themselves are made of an EL material, as described in U.S. Pat. Nos. 3,749,977-Sliker, 4,775,964-Alessio & Olsen, 4,208,869-Hanaoka, 5,029,046-Kamede 5,117,334-Kamede. In all of these references direct illumination is provided upward towards the viewer, restricting any aesthetic aspects such as a full color logo or colored images on the dial. Another disadvantage of EL's is that they require complicated auxiliary circuitry. Moreover, the lighting colors are determined by phosphorus contents of the EL, and are limited commercially to colors such as blue-green, white and yellow.

OBJECTIVES AND SUMMARY OF THE INVENTION

It is, accordingly, an objective of the present invention to eliminate the above-mentioned disadvantages encountered in the prior art and provide a system through which sufficient illumination can be provided to both indicia of interest as well as logos and other decorative elements.

It is another objective of the present invention to provide an illumination device for an electronic or analog timepiece, indicator gauge, directional gauge or ornamental device or other articles eliminating any EL as the illumination source and its associated circuitry.

Another objective of the invention is to provide an improved illumination apparatus for viewing the dial or surface of various objects by positioning an illumination device to direct light in a direction towards the subject to be illuminated which makes viewing easier, more efficient and less stressful to the viewer.

A further objective of this invention is to provide in situations such as limited lighting or at night time, the cosmetic illumination of single or multiple color images, logos or items located on or about the surface of a timepiece, indicator or directional gauges or ornamentation devices.

The present invention seeks to attain these objectives by disposing a light-emitting element, on or inside a light transmissive surface of the article to be illuminated. This element is positioned in the center, sides or in a random placement and rendered light emissive or is activated by means of an electronic circuit which is installed within or in proximity of said article. An illumination switch controlled by an external control member is provided on the case of the article for selectively activating the light emitting element.

More particularly, the light source is disposed either on an inner surface of, or is imbedded within the cover or article itself, in such a manner that is virtually invisible to the viewer.

BRIEF DESCRIPTION OF THE DRAWINGS

The invention will be better understood by reference to the following description, taken in connection with the appended drawings, in which like reference numerals indicate like parts, and in which.

DETAILED DESCRIPTION OF THE PREFERRED EMBODIMENT

Figure 1:
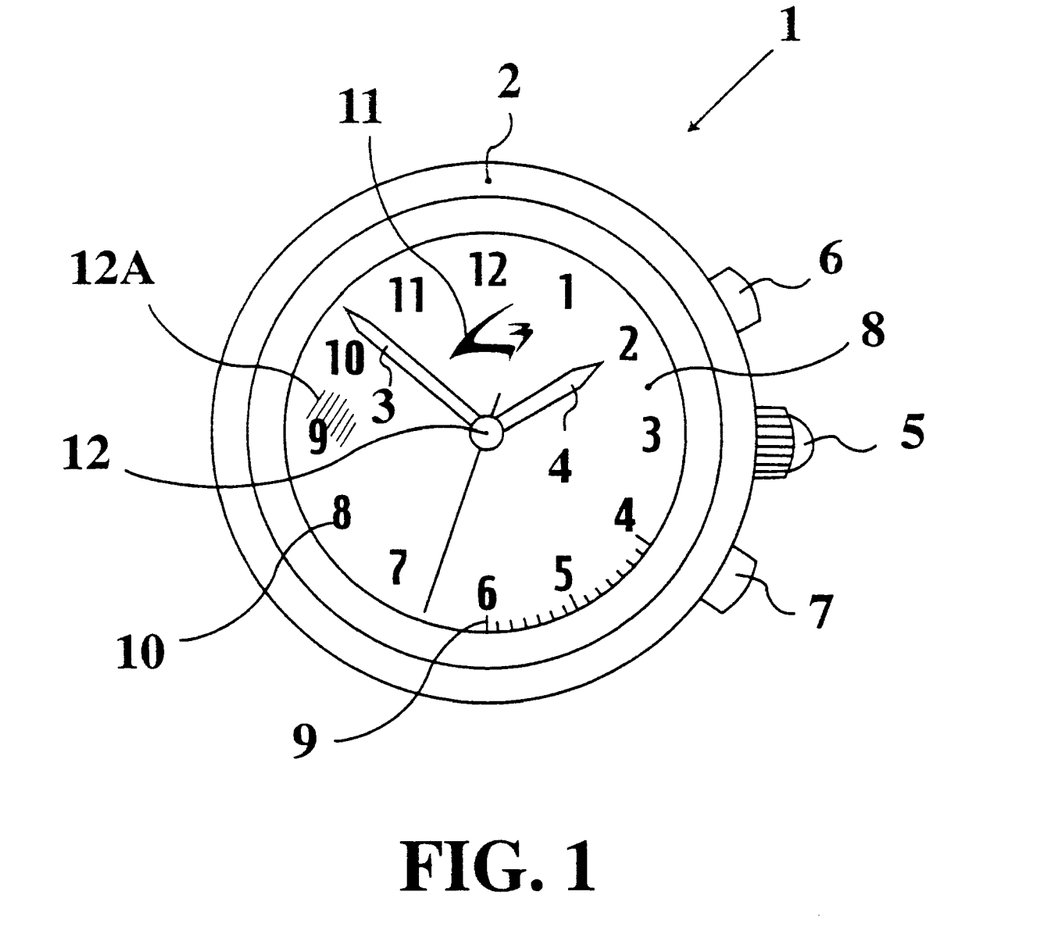
FIG. 1 is a top view of an analog watch, with a light source positioned in the center of the inside surface of the watch cover pointing in a downward direction towards the dial.
Figure 6:
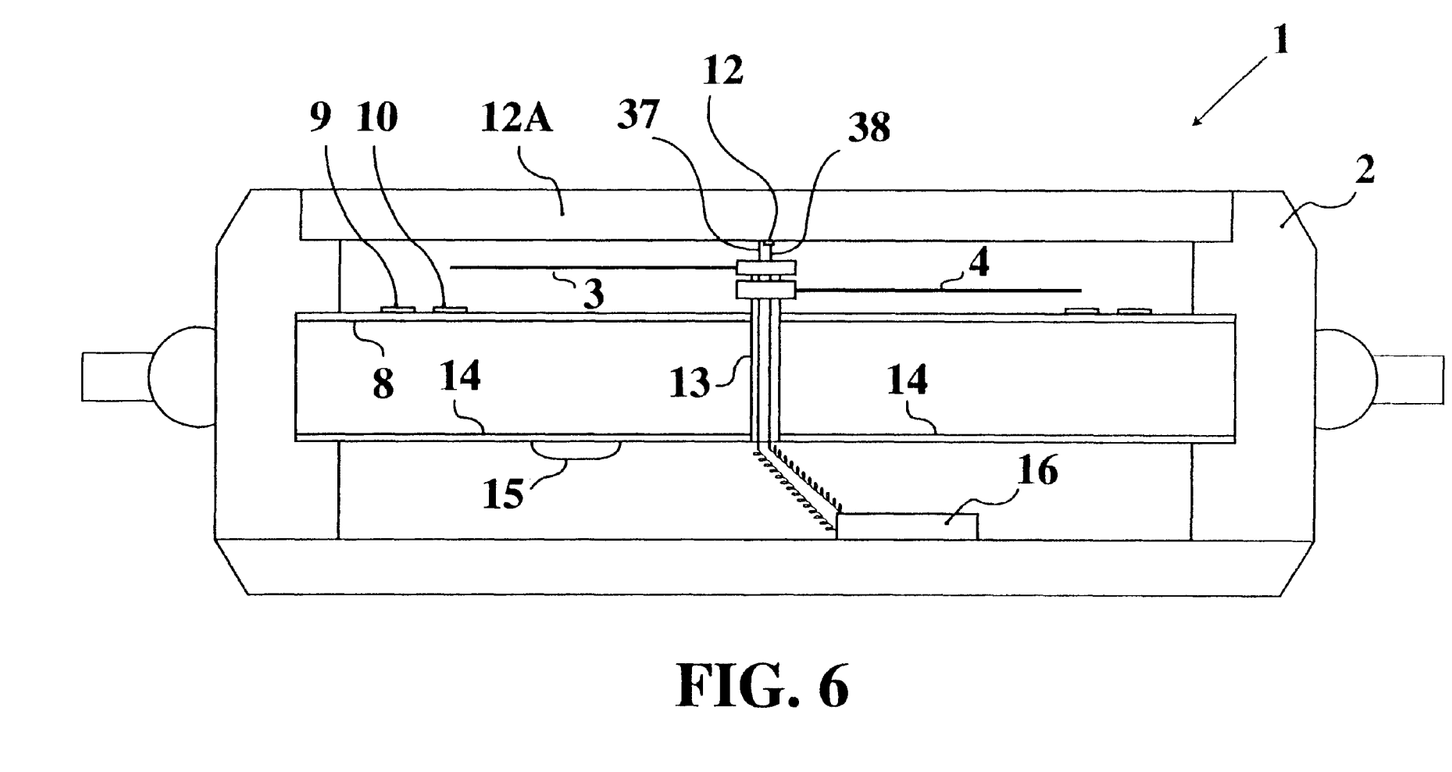
FIG. 6 is a cross-sectional schematic view of the watch of FIG. 1.

FIGS. 1 and 6 illustrates a top view and a cross sectional view of an analog timepiece such as a wristwatch 1 with a conventional case 2 and with a minute hand 3 and an hour hand 4 mounted on rotatable stems 13 and driven by a conventional movement, the details of which are not material to the present invention and thereafter have been omitted. A button 5 is employed to set the position of the time hands 3 & 4. Push button actuators 6 & 7 connected to operate switch contacts (not shown) inside the case of the watch. Actuators 6 and 7 may be used to actuate the subject light source, as well as to provide other optional functions.

Below the hands 3, 4 there is a dial 8 having time indicating indicia thereon, such as the hour and minute markers 9, numerals 10 and an image or logo 11. Importantly, dial 8 and all the indicia thereon are illuminated by one or more light sources 12 such as a light emitting diode, (herein referred to as an LED (described in more detail FIG. 4). In FIG. 1, source 12 is positioned at the geometric center of dial 8. Alternatively, several such sources may be used which are distributed around the dial. Moreover, in the embodiment shown, the source 12 is mounted or secured to a bottom surface of a standard transparent or translucent cover 12A covering and being coextensively with dial 8.

Figure 2:
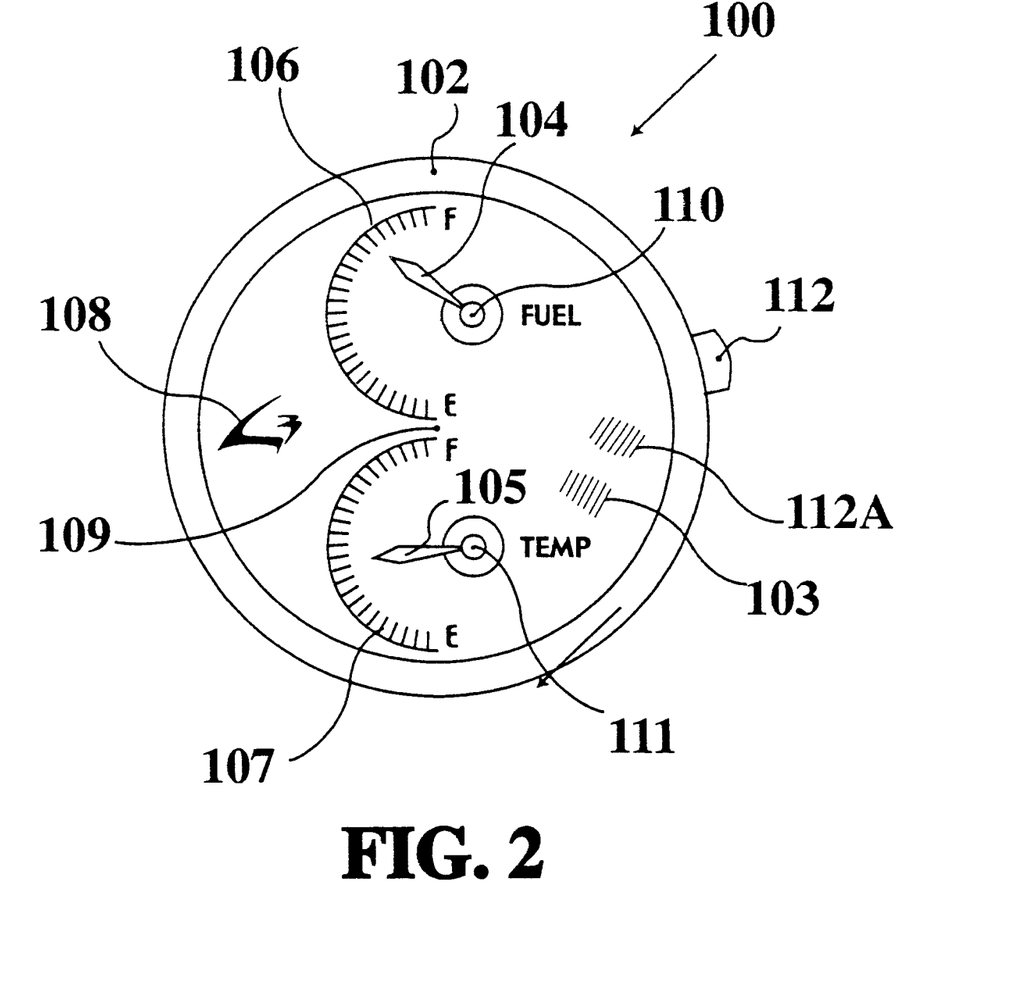
FIG. 2 is a top view of one or more indicator or directional gauges, with a light source positioned in the center of the inside surface of the gauge's translucent or transparent cover and pointed in a downward direction towards the meter panel.

FIG. 2. shows a top view of an indicator gauge 100, with a conventional case 102, a meter panel 103, with several indicator hands such as a fuel gauge hand 104 and a temperature gauge hand 105. Below the hands are 104, 105 corresponding dials 106, 107 having measurement indicating indicia thereon, representing as the level of the fuel or temperature. The indicator gauge 100 may also be provided with a decorative or source identifying image or logo 108. The indicator gauge 100 may be used, for example, on the dashboard of an automobile or any other system.

The dials 106, 107 and logo 108 are illuminated by a light source 109 such as an LED, again positioned in the center of case 102. Alternatively, sources could be provided at several such as locations 110 and 111. The source or sources are directed downward from cover 112A. A push button actuator 112 connected to operate switch contacts (not shown) inside or within proximity of the indicator gauge 100.

Figure 3:
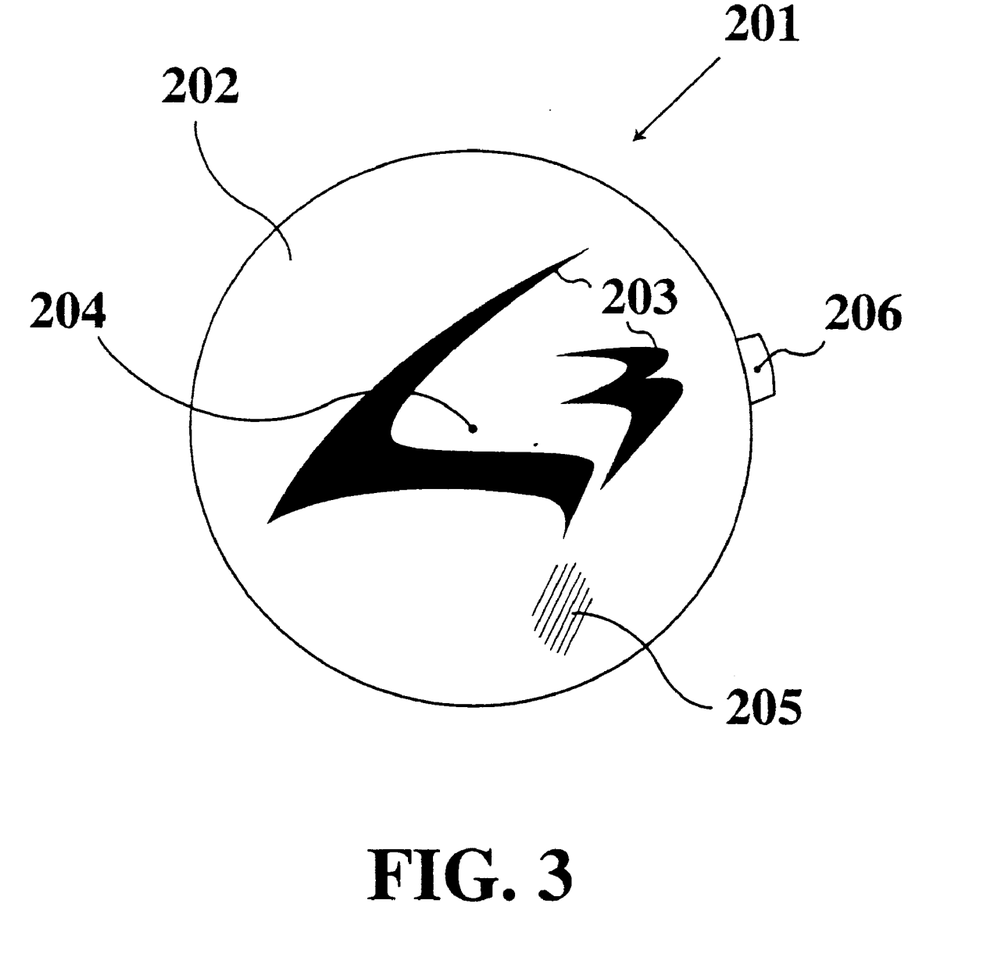
FIG. 3 is an enlarged top view of an ornamentation device with a light source positioned in the center of the ornamentation devices and pointing in a downward direction towards an image, logo or three dimensional or planar design.

FIG. 3 shows a top view of an ornamentation device 201 which could be made from an injection molded transparent thermoplastic acrylic resin having a base 202, a planar or 3D image, or a logo or design 203. The base 202 is covered by a protective body 205. Since the device 201 has no moving parts, the body 205. could envelope the logo or design 203 so that there is no air contained therein. Alternatively, the device 201 maybe have liquid filled body with the logo or design "23" being disposed in the liquid.

Imbedded in solid body 205 there is provided a light source 204 such as an LED. Source 204 can be centrally located as shown. Alternatively several sources (not shown) may be provided for illuminating design 203 all pointing downward toward base 202, and logo 203. A push button actuator 206 could be connected or within proximity to operate switch contacts (not shown) inside or within proximity of the ornamentation device 201.

Figure 4:
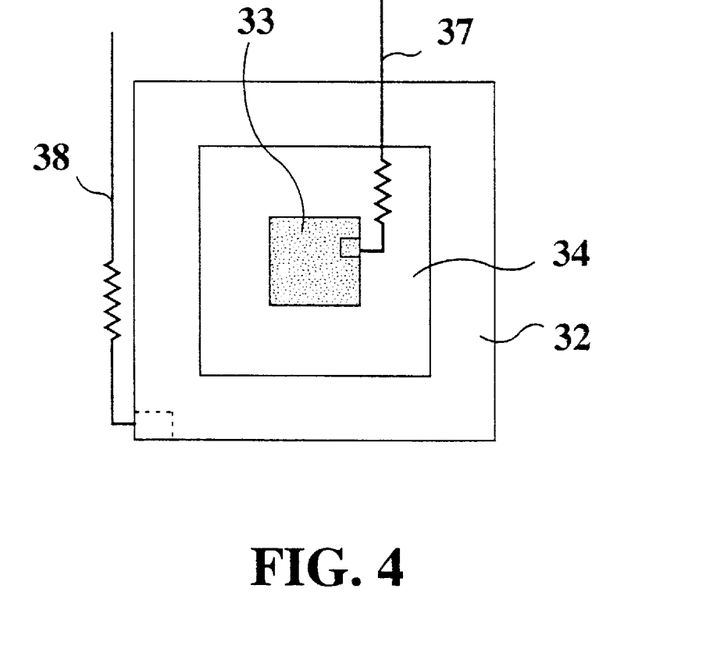
FIG. 4 is a top view of a solid-state LED used as a light source for illumination as shown in FIGS. 1–3.
Figure 5:
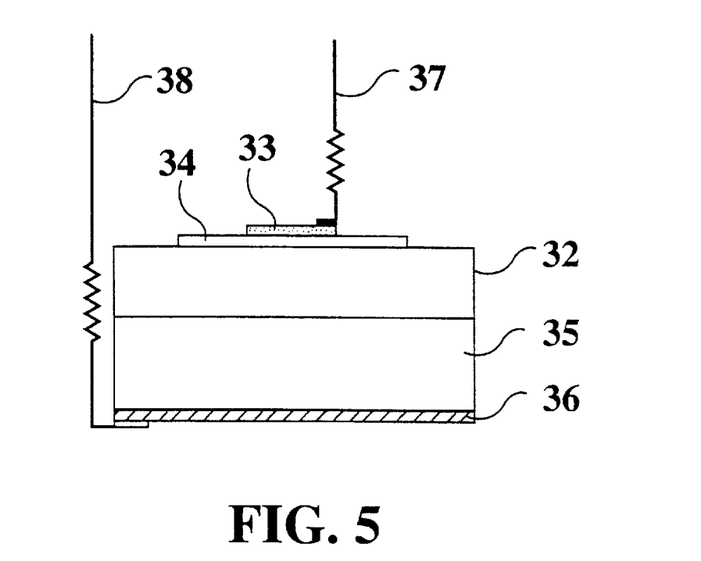
FIG. 5 is a cross-sectional view of the solid-state LED of FIG. 4.

Each of the sources of FIGS. 1, 2 and 3 maybe LED constructed and arranged as shown in FIG. 4 and 5. More particularly, each source includes a substrate 34, a substrate 32 and a substrate 35. These three substrates cooperate to form a standard light emitting diode. Typically substrate 34 may be about 10×10 mils while substrates 32 and 35 may be about 12×12 mils. The bottom surface (as oriented in FIG. 5) of substrate 35 is covered by a metallic layer 36 which forms the cathode for is, the diode. A portion of a top surface of substrate 34 is covered by a metallic layer 33 which defines the anode for the diode. Layer 33 may be for instance about 4×4 mils. Preferably layers 33 and 36 are made of gold. It should be understood the sources may be made using other types of technology besides LED's as well.

Two thin wires 37 and 38 are made of gold or aluminum are connected to the layers 33 and 36 respectively either directly or by resistors as shown.

Referring again to FIG. 6, source 12 is adhesively attached to the bottom or inner surface of cover 12A. Stem 13 is a hollow coaxial cylindrical stem which drive the hands 3 and 4. The wires 37, 38 pass through the stem 13 and extend to the source 12.

Disposed below the dial 8 is a circuit board 14, with an electronic control circuit 15. Wires 37, 38 are connected to circuit 15. A battery 16 is used to provide power to circuit 15 and source 12. The circuit 15 (which may be an ASIC—application specific integrated circuit) is connected to an activator such as button 6. When the push-button actuator 6 is pushed, the source 12 is turned on. Alternatively, a timer may be built in to circuit 15 so that the source 12 remains on for a preselected time period.

Figure 7:
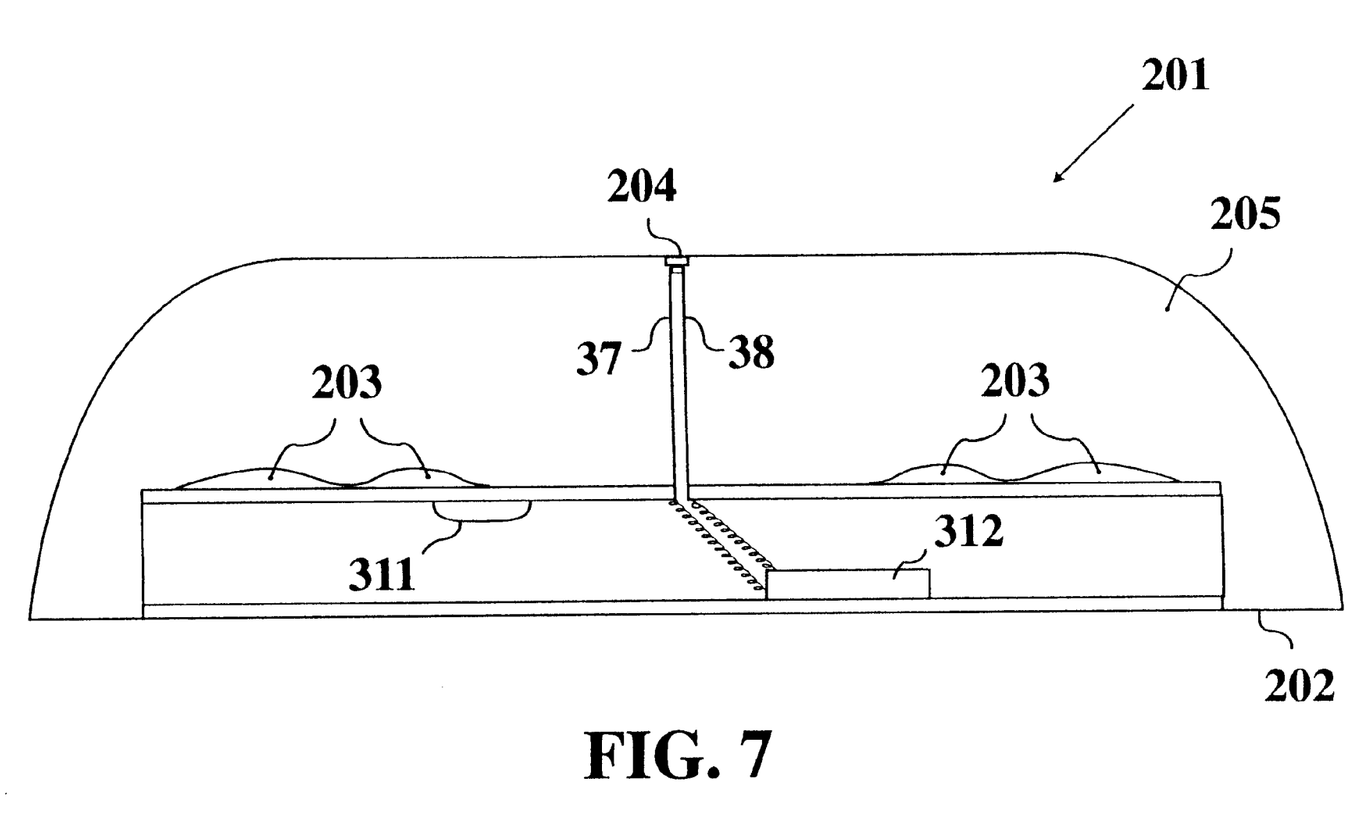
FIG. 7 is a cross-sectional schematic view of the ornamentation of FIG. 3.

FIG. 7 shows a cross-sectional view of the ornamentation 201. In this Figure, source 204 is connected to an electronic circuit 311 and battery 312 by wires 37, 38. The circuit 311 and battery 312 are disposed under the design or logo 203, as shown.

Figure 8:
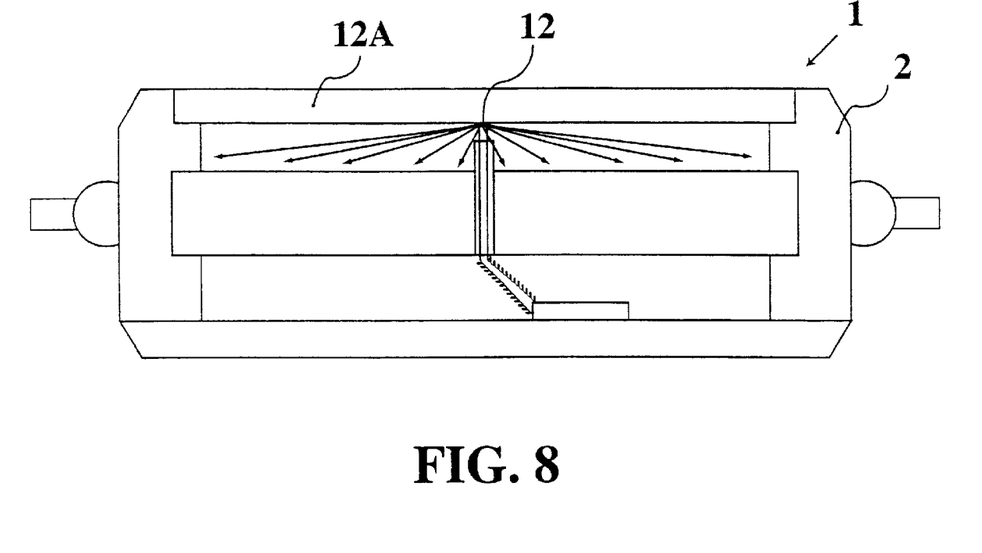
FIG. 8 is a cross-sectional view of the illumination pattern generated in for the watch of FIGS. 1 and 6.
Figure 9:
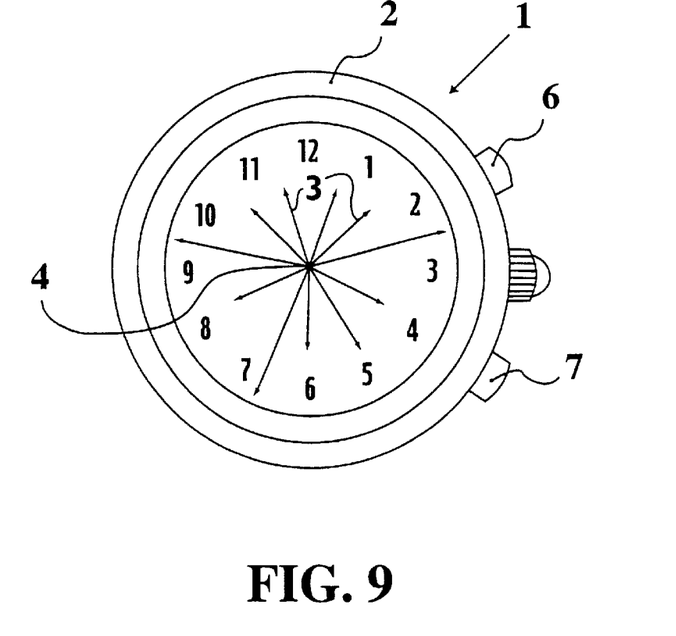
FIG. 9 is a top view of the illumination pattern for the watch of FIGS. 1 and 6.

FIGS. 8 and 9 show in a somewhat stylized manner how the source 12 generates light rays in a uniform and even manner to illuminate the entire dial 8.

As previously mentioned, LED's with very high efficiency and various colors are now available and are ideally suited for as the subject light source. For example, a blue LED made of GaN with a SiC substrate can generate a 600 micro watt output at 430 nm peak wavelength. A green L.E.D. operated at 20–30 $\mu$ both a forward biasing voltage of 2V can generate 2.5–2.5 mcd. Superbright orange and red emitters are also available which can generate about 10 mcd at 630 nm with a power consumption of 70 mw.

Figure 10:
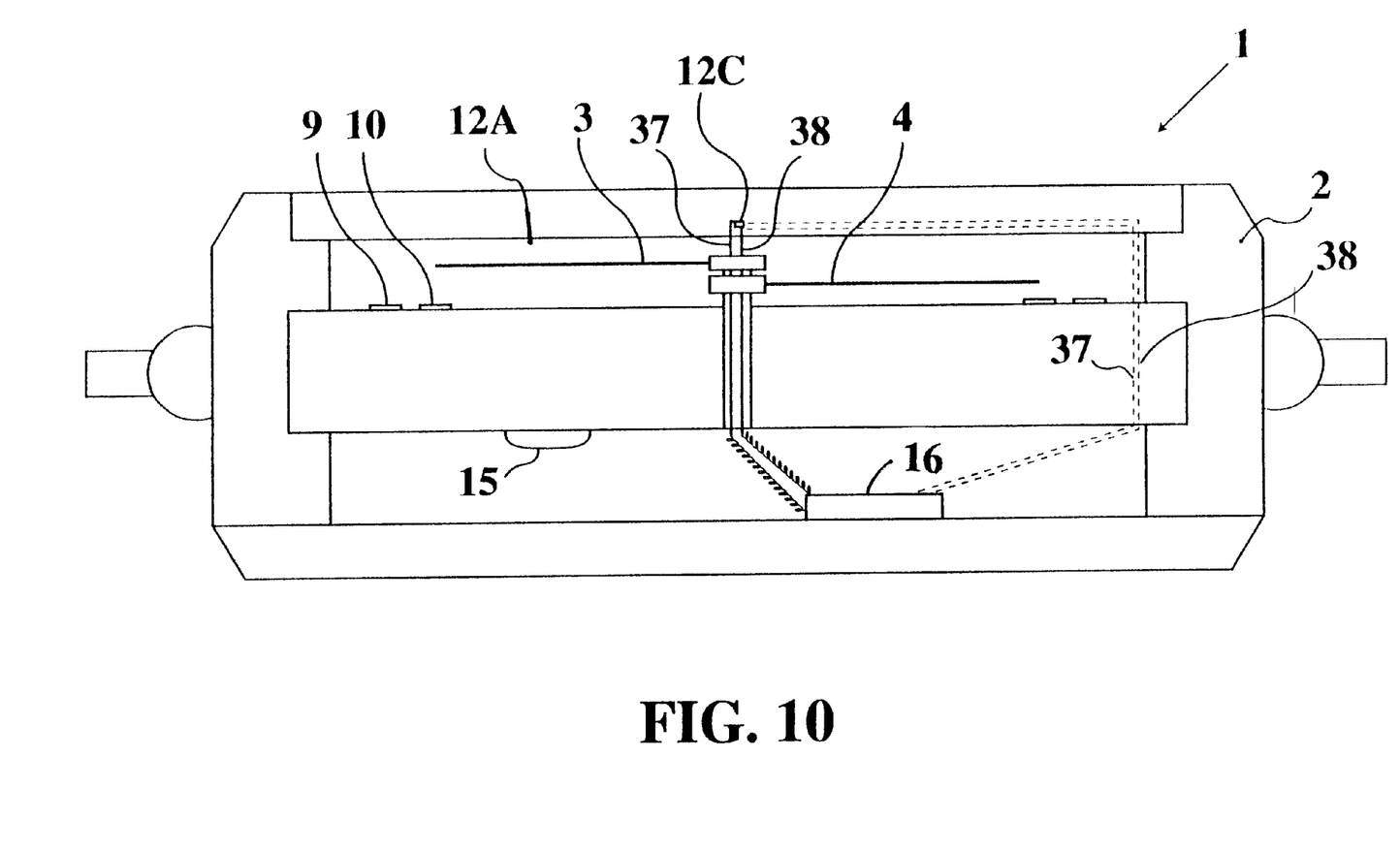
FIG. 10 shows a cross-sectioned view of a watch illustrating a second embodiment of the invention.

In one embodiment of the invention, the sources 12, 204, etc. are attached, for example by an adhesive, to the lower or inner surface of the respective protective covers 12A, 112A, 205. In an alternate embodiment, instead of joining the source to the surface of the respective cover, the source can be imbedded directly into the cover. For example, as shown in FIG. 10, the timepiece 1 of FIGS. 1 and 6 is shown with a source 12C which in this case is imbedded in cover 12A. Wires 37, 38 can be led downward through the stem of the hands as in FIG. 6, or as indicated by the dashed lines, the wires could be arranged either on the bottom surface or protective cover 12A to extend laterally or radially to the case and then passed through the case to the battery 16 and circuit 15, or they can also be imbedded into cover 12A together with source 12C.

Figure 11:
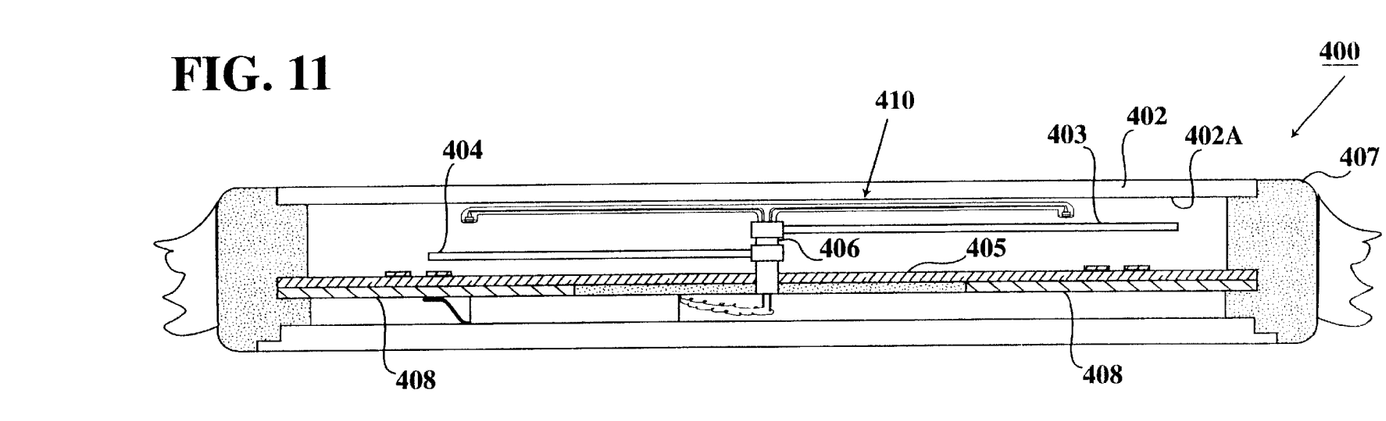
FIG. 11 shows a cross-sectional view of a watch illustrating a third embodiment of the invention.
Figure 12:
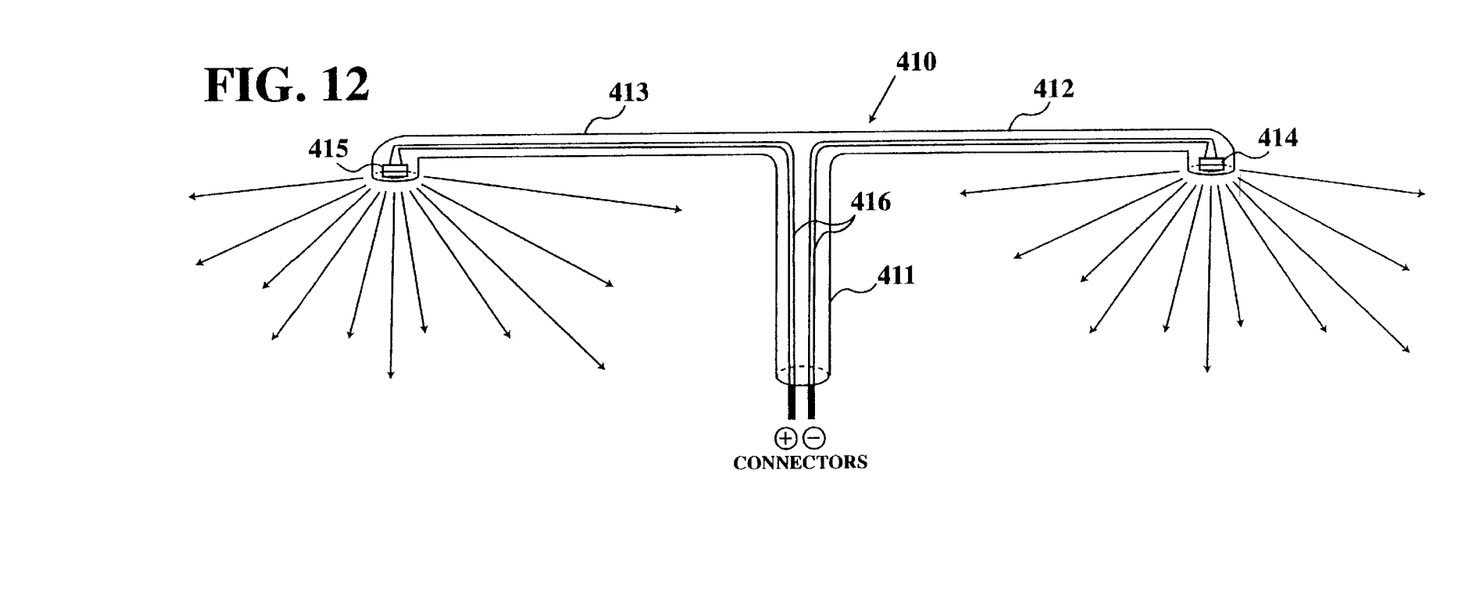
FIG. 12 shows an enlarged view of the embodiment of FIG. 11.

Another embodiment of the invention is shown in FIGS. 11 and 12. In this embodiment, a watch 400 is provided with a cover 402, hands 403, 404, dial 405, stem 406, case 407, and an electronic circuit 408. (A separate battery has been omitted for the sake of simplicity). Importantly, watch 400 is further provided with a T-shaped structure 410 having a leg 411, and two arms 412, 413, terminating in light sources 414, 415.

Structure 410 is cast or molded from a transparent, light but strong material such as a polymer. Imbedded in the structure 410 are wires 416 connecting light sources 414, 415 to electronic circuit 408. Preferably, the structure 410 is positioned so that its leg 411 passes through stem 406 and its arms 412, 413 are disposed adjacent to a bottom surface 402A of cover 402 as shown and supported by the leg 411 and/or stem 406. If necessary, the arms 412 and 413 may be attached to the surface 402A by a suitable adhesive. It should be understood that FIG. 11 shows structure 410 with two arms 412, 413, however it can have any number of arms. Moreover, these arms can have the same length or may have unequal lengths. These arms have two functions; they support sources 414, 415 and they provide a means of supporting wires 416. The ends of the arms are strategically positioned to provide proper illumination of the dial 405 by sources 414, 415.

Figure 13:
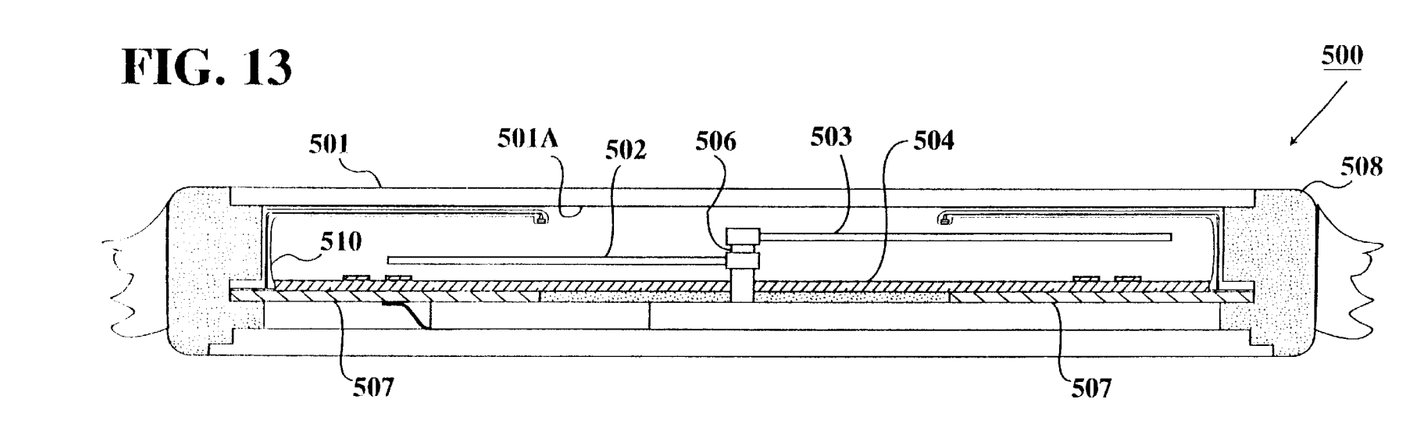
FIG. 13 shows a cross-sectional view of a watch illustrating a fourth embodiment of the invention.
Figure 14:
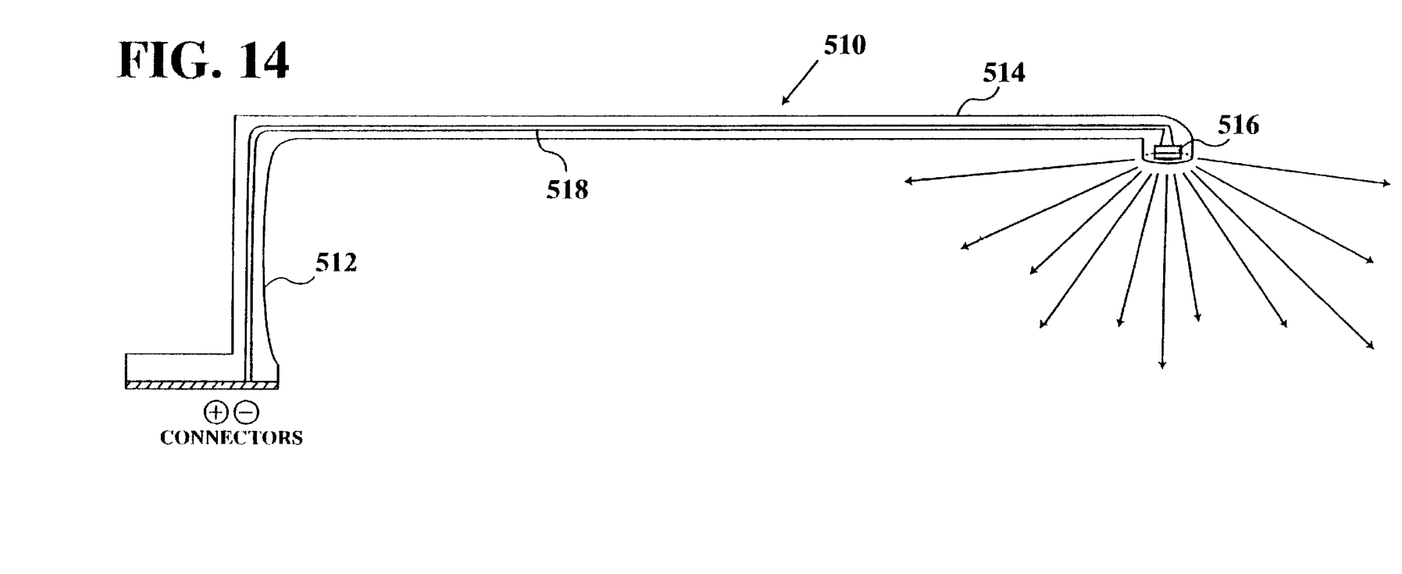
FIG. 14 shows an enlarged view of the embodiment of FIG. 13.

FIGS. 13 and 14 are similar to FIGS. 11 and 12 and show an alternate illuminating means. For these Figures, watch 500 is provided with a cover 501, hands 502, 503, a dial 504, a stem 506, an electronic circuit 507 and a case 508. In this embodiment one or more structures 510 are provided. Each structure 510 is L-shaped with a short vertical leg 512 and a long horizontal arm 514 terminating in a source 516. Imbedded in arm 514 are a pair of wires 518 connecting source 516 to electronic circuit 507. The wires from leg 512 pass through the dial 504 adjacent to case 508.

Structure 510 is molded from a clear plastic material just like structure 410 and is supported in the position shown in the Figures by leg 510 as it passes through the dial 504. The watch 500 can be provided with several structures 510, arranged to position the sources 516 in a predetermined pattern on cover 501.

The arm 514 may be made long enough to extend to stem 506 so that the source 516 is disposed at the center of cover 501, if desired. The arm 514 is normally cantileveredly supported by leg 512, but if necessary, it can also be adhesively attached to the inner surface 501A of cover 501. The structures 410, 510 are sized and shaped so that they are virtually invisible.

It should be understood that the light sources can be made into almost any color desirable.

Figure 15:
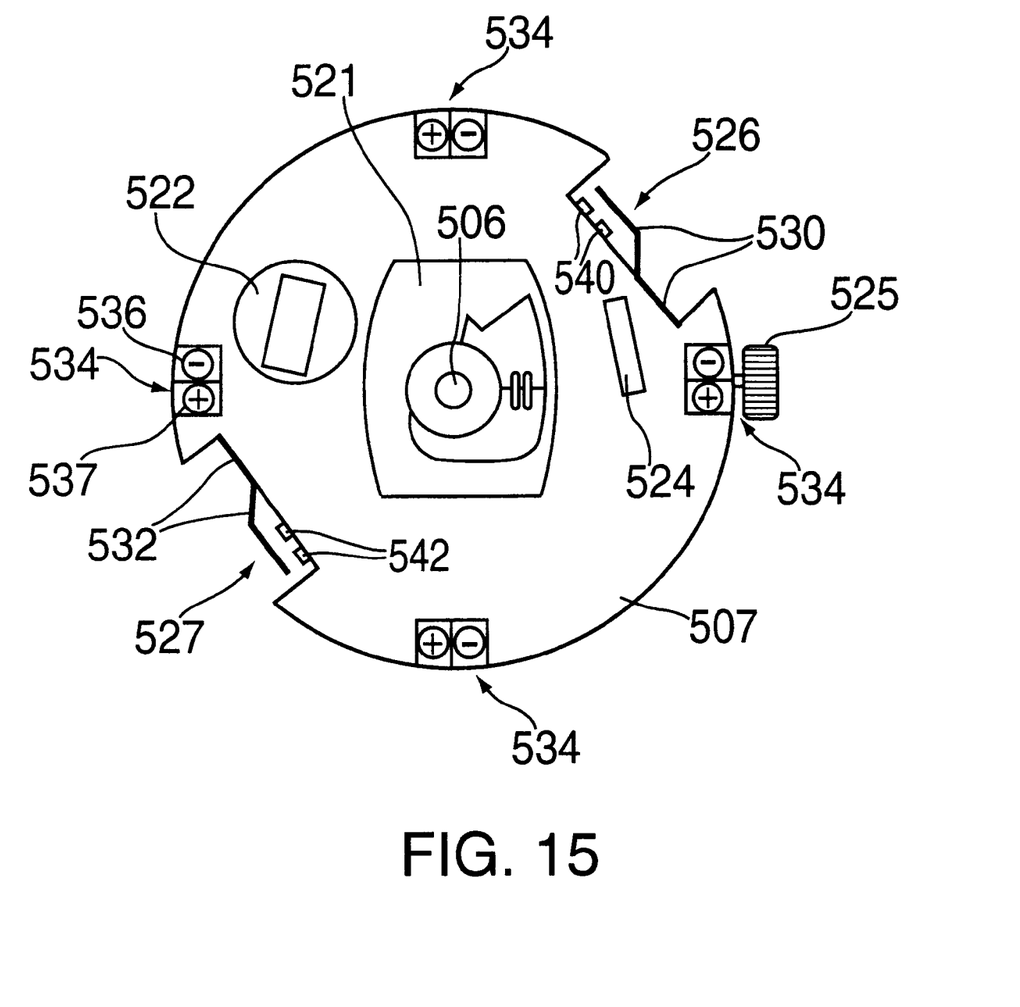
FIG. 15 shows a top view of the circuit board for the embodiment of FIGS. 13 and 14.

Referring now to FIG. 15, circuit board 507 is formed with a central opening 521 and supports various electronic circuits such as 522 and 524 used to drive an analog stepping motor (not shown) operating the hands 502, 503 and/or the light sources 516. The stem 506 passes through the opening 521 and is mechanically coupled to a knob 525 used to position the hands manually when required.

The circuit board 507 is also provided with two arcuate slots 526, 527. Disposed within this slots are respective elastomeric members 530, 532.

Also mounted on circuit board 507 are a plurality of contact pads 534, each pad having two terminals 536, 537. In FIG. 15 four pads are shown for a configuration wherein four corresponding structures 510 are provided. The pads 534 are arranged under each leg 512 of a corresponding structure 510. In this position, each of the wires 518 within the structure 510 comes into electrical contact with one of the terminals 536, 537. At least one of the terminals, such as terminal 536 on pad 534 is connected electrically to one of the corresponding elastomeric members 530, 532. These members 530, 532 are arranged so that when they are pushed radially inwardly (for example by external knobs mounted on case 508 in the usual manner), they establish a contact with terminals 540 or 542, thereby providing a control switch to operate selectively light sources 516 through the circuit 522.

Obviously numerous modifications can be made to the invention without departing from its scope as defined in the appended claims.

I claim:

1. An illuminated article comprising:

a face;

indicia disposed on said face;

a member extending a predetermined distance from said face and being made of a light transmissive material to allow said indicia to be viewed through said member, said member having an external surface extending over and facing said face; and a light source being attached to said external surface and oriented to direct light at said indicia to illuminate said indicia.

2. The article of claim 1 wherein said light source comprises an LED.

3. The article of claim 1 further comprising a case, said surface being incorporated into said case and said member being attached to said case.

4. The article of claim 3 further comprising a power source providing power to said light source.

5. The article of claim 4 wherein said control element comprises a timer which couples said light source to said power source for a predetermined time period.

6. The article of claim 4 further comprising a control element to selectively activate said light source.

7. The article of claim 6 wherein said control element comprises a switch which selectively couples said power source to said light source.

8. A watch or similar instrument comprising:

a dial;

indicia provided on said dial, said indicia including at least one of a hand indicative of a parameter, a logo and a decorative design;

a protective cover disposed at a predetermined distance from said dial and made of a light transmissive material to allow said indicia to be visible through said cover, said cover having an external surface facing said dial; and a light source arranged to direct light at said indicia from said protective cover to render said indicia visible in the dark, said light source having a size small enough to be substantially invisible through said cover and being attached to said external surface.

9. The instrument of claim 8 wherein said light source is an LED.

10. The instrument of claim 8 further including a case holding said dial, a power source disposed in said case and a controller for selectively applying power from said power source to said light source.

11. The instrument of claim 10 further comprising conductors joining said light source to said power source and said controller.

12. The instrument of claim 11 wherein said dial comprises a stem and wherein said conductors pass through said stem.

13. The instrument of claim 11 wherein said conductors are arranged along said cover to a point where said cover joins said case.

14. The instrument of claim 8 further comprising a support structure having an arm extending under and attached to said cover, and an end, said source being attached to said end.

15. The instrument of claim 14 further comprising a case, said cover having an edge supported by said case, and wherein said support structure includes a leg attached to said arm and disposed at said edge.

16. The instrument of claim 14 further comprising an electronic circuit controlling said light source and wires connecting said light source to said electronic circuit, said wires being imbedded in said support structure.

17. The instrument of claim 14 further comprising a stem passing through said dial, wherein said support structure includes a leg attached to said arm and passing through said stem.

18. The instrument of claim 17 wherein said stem is disposed at a center of said cover.

19. An illuminated article comprising:

a case;

a display surface disposed in said case;

indicia disposed on said display surface;

a member extending a predetermined distance from said display surface and being made of a light transmissive material to allow said indicia to be viewed through said member, said member having an external surface facing said display surface;

a light source supported by said member on said external surface and oriented to direct light at said indicia to illuminate said indicia;

a power source spaced away from said member; and a plurality of conductors attached to said external surface and extending from said light source to said power source to provide power to said light source.

20. The article of claim 19 further comprising a switch provided for selectively activating said light source.

21. The article of claim 19 wherein said power source is disposed under said display surface.

22. The article of claim 21 wherein said case has a sidewall and said conductors extend along said sidewall to said power source.

23. The article of claim 19 wherein said power source is an LED.

24. The article of claim 23 wherein said LED comprises several substrates superimposed to define semiconductor junctions, wherein one of said substrates is attached to said external surface.

* * * * *